United States Patent [19]
Braun et al.

[11] Patent Number: 6,013,691
[45] Date of Patent: *Jan. 11, 2000

[54] EXPANSIBLE SEALANT COMPOSITIONS AND BLOWING AGENTS

[75] Inventors: Robert Braun, New Lenox; Jess Garcia, Lockport; Dawn Kissack, Joliet; Gina Pietrzyk, Darien; Deborah Schutter, Minooka, all of Ill.

[73] Assignee: Insta-Foam Products, Inc., Joliet, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,671

[22] Filed: May 21, 1996

[51] Int. Cl.$^7$ .............. C08J 9/12; C08G 18/28; C08G 18/40; C08G 18/48
[52] U.S. Cl. .............. 521/130; 521/106; 521/113; 521/128; 521/131; 521/133; 521/155; 521/164; 521/167; 521/170; 521/172; 521/174; 521/175; 222/635
[58] Field of Search ................ 521/106, 113, 521/128, 130, 131, 133, 155, 170, 174, 175, 164, 167; 222/635

[56] References Cited

U.S. PATENT DOCUMENTS

| | | | |
|---|---|---|---|
| 3,072,582 | 1/1963 | Frost | 521/131 |
| 3,096,001 | 7/1963 | Boe et al. | 222/135 |
| 3,112,281 | 11/1963 | Gromacki et al. | 521/167 |
| 3,343,718 | 9/1967 | Siegel et al. | 222/1 |
| 3,491,916 | 1/1970 | Graham | 222/80 |
| 3,575,319 | 4/1971 | Safianoff | 222/135 |
| 3,830,760 | 8/1974 | Bengtson | 521/112 |
| 3,966,090 | 6/1976 | Prussin et al. | 424/43 |
| 3,996,153 | 12/1976 | Heeb et al. | 252/305 |
| 4,041,148 | 8/1977 | Simons et al. | 424/45 |
| 4,139,607 | 2/1979 | Simons et al. | 424/45 |
| 4,202,470 | 5/1980 | Fujii | 222/130 |
| 4,243,548 | 1/1981 | Heeb et al. | 252/305 |
| 4,258,140 | 3/1981 | Horacek et al. | 521/114 |
| 4,263,412 | 4/1981 | Pauls | 521/114 |
| 4,301,119 | 11/1981 | Cobbs, Jr. et al. | 422/133 |
| 4,350,774 | 9/1982 | Scotti et al. | 521/95 |
| 4,422,877 | 12/1983 | Spitzer et al. | 106/122 |
| 4,439,342 | 3/1984 | Albanese | 252/305 |
| 4,667,855 | 5/1987 | Holleran | 222/152 |
| 4,906,672 | 3/1990 | Stone et al. | 521/130 |

OTHER PUBLICATIONS

Excerpt entitled "$CO_2$ blowing agent is for molded foams" from Sep., 1995 issue of Modern Plastics, p. 102.
Article entitled "Carbon dioxide debuts for molded PUR foams", Plastics World, Sep. 1996, pp. 23–26.
Brochure entitled "BEAMECH CO–2™ Workshop Flexible Slabstock Foams CO–2 Process Technology" believed to have been disseminated subsequent to May 21, 1996.

*Primary Examiner*—Rabon Sergent
*Attorney, Agent, or Firm*—James T. FitzGibbon; Vedder, Price, Kaufman & Kammholz

[57] ABSTRACT

The present invention discloses a foam frothing alternative for blowing or frothing single component foams using gases which are incapable of being liquified within the limits of DOT aerosol cans, referred to herein as non-liquefiable gases. In this invention, it is demonstrated that non-liquefiable gases such as $CO_2$ and $N_2O$ can be used to provide foams using conventional single component foam chemical raw materials. The present invention provides an adhesive/sealant, expanded by a non-liquefiable gas propelled from a container initially and expanded by a blowing agent consisting primarily or exclusively of a non-liquefiable gas and formulated from a moisture curable polyurethane prepolymer using a low molecular weight isocyanate of two or more functionality. In one or more variations, the compositions of the present invention contain solubility enhancers for non-liquefiable gases such as $CO_2$ or supplemental propellants/liquefiable blowing agents, as well as other additives such as, for example, catalysts, fire retardants, and surfactants which include, but are not limited to cell openers.

25 Claims, No Drawings

EXPANSIBLE SEALANT COMPOSITIONS AND BLOWING AGENTS

BACKGROUND OF THE INVENTION

The present invention relates generally to improved sealants, and more particularly to convenient, economical, and environmentally non-threatening compositions and methods used for certain specialty sealing and adhesive applications.

In recent years, there has been a great increase in the popularity of containerized, curable foam sealants used for a number of purposes. Urethane foams made from two separate components are effective and economical forms of sealants that are able to be generated at or near the site of application. Such foams comprise the reaction product of two separate components, one being a hydroxyl-rich resin and the other component containing an isocyanate component. A dissolved blowing agent is usually provided in one or both of the components. The combination of the exothermic heat of reaction and the reduction in pressure as the contents are released from a pressurized container into the atmosphere allows the blowing agent to vaporize, and this causes the resinous material to expand while it is crosslinking or curing.

One disadvantage of two-component systems is that the components must be thoroughly mixed immediately before discharge at or adjacent to the place of deposition. This requires relatively precise mixing apparatus, and while it is very advantageous to use such equipment in commercial and industrial applications, and in certain sorts of new construction, for example, where a great deal of attention can be paid to the conditions of application, such systems are not always preferred from the standpoint of convenience, reliability, and cost. These systems are rarely used by the do-it-yourself consumer.

Thus, the mixing and dispensing operations must be able to be carried on if the presence of a relatively accurate metering so that the resultant product is chemically and structurally satisfactory. Inasmuch as the two components react rapidly with each other, application must immediately follow mixing, and a disposable nozzle is required for each application sequence. Thus, once the components mix, they react and further dispensing cannot be achieved unless the sources of the components remain isolated from each other.

A consequence of the foregoing has been that for smaller scale applications, especially in sealing and adhesive applications and small-scale void filling, including the do-it-yourself or hobby market and the smaller scale portions of the residential or commercial markets, so-called single component foams have achieved a dominant position in the market. Single component foams are so-called because they dispense from a single container without the need for component mixing or nozzle replacement. Their constituents are actually two essential components premixed within a container, but the crosslinking or curing reaction does not take place until the contents have been discharged from the container, whereupon the curing reactions that result in a finished product take place.

In the last 10 years or more, the blowing agents necessary to transform solidifying liquid reactants into foam have been chosen from a small list of products. The commonly used agents for both two component and single component foams have been liquefiable gases, including hydrocarbons, hydrochlorofluorocarbons, hydrofluorocarbons, and chlorofluorocarbons. These chemicals usually serve as both partial propellants and blowing agents for the foam. One advantage of a liquefiable propellant is the inherently somewhat self-regulating nature of the achievable pressure, and the concomitant ability to dissolve or at least store significant amounts of blowing agent/propellant within a container that can tolerate only modest pressures.

In many prior art two component and single component urethane foams, the liquified gas creates a pressure in the headspace that acts as all or part of the propellant, but a much greater quantity is dissolved in the liquid constituent, serving as an expanding or blowing agent converting the solidifying liquid or gel-like reactants into a foam product, usually of a closed-cell, rigid type for purposes of sealing or the like.

Unfortunately, it has been discovered that the use of liquefiable gaseous blowing agents have substantial drawbacks. Many of the blowing agents/propellants formerly used were chlorofluorocarbons, which have been determined to be hazardous to the environment. Such materials, when escaping to the upper atmosphere and exposed to radiation, undergo chemical reactions resulting in a depletion of the concentration of ozone in the upper layers of the atmosphere. Accordingly, such blowing agents are no longer considered desirable or legal for such applications.

Pure hydrocarbons, such as butane, propane, or mixtures of these and other of their isomers also have the advantage of being readily liquified. However, the gaseous hydrocarbons can be a serious fire hazard. Especially in construction areas, it is not desired to leave flammable residues in the product, or create a flammable gas atmosphere in any of the work areas where the products are dispensed. Additionally, hydrocarbons create a Volatile Organic Compound (VOC) problem contributing to ground level smog.

In the past, and in fact, in the earliest use of urethanes, carbon dioxide ($CO_2$) was used as a blowing agent for urethane foams. However, such $CO_2$ was not supplied as a gas independently of the reaction, but resulted from reacting a portion of the isocyanate with water. The remaining portion was used to create part of the polymers. Historically speaking, it was common to provide hydroxyl-rich resins, and a small amount of water in part 'B' which, when exposed to the isocyanate, in part 'A', would create the carbon dioxide blowing agent that resulted in the production of a polyurethane foam product.

The principal drawbacks of such chemistry were twofold. First, the system was practical only where two components could be kept separate until reaction. Second, the isocyanate is the most expensive constituent of polyurethane foams, and using it as a source of $CO_2$ is not considered desirable. This is what created the impetus to search for other propellants in the past, and was essentially responsible for the development and widespread use of chlorofluorocarbons and similar liquefiable gases as foaming agents/propellants.

The present invention overcomes the disadvantages and drawbacks of the prior art by providing a novel and previously thought impossible foam frothing alternative for blowing or frothing single component foams using non-liquefiable gases. Historically, single component foams relied on liquefiable gases (as described above) which generally were thought required for both propellant and blowing agent. In this invention, it is demonstrated that non-liquefiable gases such as carbon dioxide ($CO_2$) and nitrous oxide ($N_2O$) can be used to provide foams using conventional single component foam chemical raw materials.

Because the need for expansible sealants and adhesives which could be propelled from their containers and expanded by the use of inert, non-flammable, non-threatening materials has not been met, it is an object of the present invention to provide an improved foam type expansible sealant/adhesive propelled by an inert, non-environmentally threatening material.

A further object of the invention is to provide a sealant composition which may be dispensed under the pressure of an inert gas thereby propelling the sealant from a container and through a narrow dispensing tube to the point of application, which the inert gas will expand the composition sufficiently to provide an adhesive bead of an insulating resinous material.

A still further object of the invention is to provide a sealant with insulating and adhesive properties that is propelled from the container and expanded by means of carbon dioxide or other non-liquefiable gas initially present in the container.

Another object of the invention is to provide a so-called single component expansible adhesive sealant that will meet the current application requirements for this type of product and act as an adhesive in specific applications.

Yet another object of the invention is to provide a primarily $CO_2$-expanded urethane sealant which requires no pre-mixing and in which the curing or crosslinking reaction is activated by discharge in a location having ambient atmospheric moisture, and which may include small proportions of supplemental propellants or the like.

Still another object of the invention is to provide a sealing and insulating cellular adhesive composition that is economical and easy to use.

An additional object of the invention is to provide an adhesive sealant composition having ingredients which permit dissolving of an inert, propellant/foaming gas in order to increase the amount of inert gas that can be stored within a container at pressures considerably less than the liquefiable pressure of $CO_2$ and within the pressure limits of commercially available aerosol containers.

The invention achieves its objects and others by providing an adhesive/sealant, expanded by a non-liquefiable gas propelled from a container initially and expanded by a blowing agent consisting primarily or exclusively of a non-liquefiable gas and formulated from a moisture curable polyurethane prepolymer and reacted within the container using a low molecular weight isocyanate of two or more functionality, and in one or more variations, contains solubility enhancers for gaseous $CO_2$ or supplemental propellants/liquefiable blowing agents.

The manner in which the invention achieves its objects and advantages will become more clearly apparent when reference is made to the following illustrative examples of the practice of the invention appearing below.

DESCRIPTION OF THE PREFERRED EMBODIMENTS OF THE INVENTION

While the inventive products may be made from different materials, illustrative examples are set forth of the presently preferred manner of practicing the invention. In the Examples, prepolymers were made from the ingredients set out in each of the tables, in the proportions appearing therein.

In the foam material, reference will be made to the "resin compositions." By "resin compositions" is meant a composition made from a number of components, less than all of which are actually resins. The polyurethane compositions which comprise the final product are made from two components which, in the trade, are referred to as an 'A' and 'B' component or an isocyanate component and resin component, respectively. Hence, the expression "resin" as used herein merely refers to the part of the composition that is not the isocyanate component nor the gaseous blowing agent. As will appear, with so-called single component foams, there is an initial reaction between some of the isocyanate and the reactive ingredients of the resin component, with the remainder of the reaction occurring after the contents are dispensed from the container by the prepolymer reacting with atmospheric moisture.

After the particular resin compositions were made, the amount (by weight) of such compositions set forth in the following description was mixed with a predetermined excess amount of the isocyanate constituent described in detail below. After that, the container was filled with $CO_2$ or other gaseous blowing agent/propellant under pressure. The entire packaged product was therefore in the form of a single container of prepolymer, excess isocyanate, catalyst, other ingredients and a propellant, all typically having a net ingredient weight of about 340 grams.

It will be appreciated that a variety of isocyanate components can be used in the present invention. Especially useful in the present invention are aromatic isocyanate components such as diphenylmethane-4,4' diisocyanate (MDI), toluene diisocyanate (TDI) and the like, as well as alicyclic isocyanates and aliphatic isocyanates such as hexamethylene diisocyanate (HMDI).

It will also be appreciated that a variety of hydroxyl containing components can be used in the present invention. Preferred hydroxyl components are polyols having an average molecular weight of less than 10,00. Especially preferred hydroxyl components are polyols such as polyether polyols having a molecular weight of approximately 1000 and including a plurality of secondary hydroxyl groups such as, for example, Poly G® 30-168 polyether polyol sold by Olin and ARCOL® LG-168 polyether polyol sold by ARCO Chemical. Other preferred polyols include Poly G® 20-112 polyether polyol described as having a hydroxyl no. of 110.2–114.2 sold by Olin Corporation, ARCOL® LG-56 polyether polyol, a 3000 molecular weight polyoxypropylene polyol described as having a hydroxyl no. of 56.2–59.0 sold by ARCO Chemical.

Polyether polyols such as Poly G® 30-168, ARCOL® LG-168 and Poly G® 20-112 are especially preferred polyols. Either of these polyols can be used alone in the compositions of the present invention or mixtures of these polyols can be used as desired, for example, to modify viscosity and/or flexibility. It will be appreciated that other polyols can be used alone and that other effective polyol mixtures can be used. For example, a wide variety of polyether polyols and polyester polyols can be used such as glycerine, polyalkylene oxide diol or triol, trimethylol propane initiated polyalkyene oxide polyol, aliphatic amino polyol, sorbitol glycol propoxylate, sucrose polyalkylene oxide polyol, sucrose-glycerine polyalkylene oxide polyol, mannich base initiated polyalkylene oxide polyol, aromatic amine initiated polyalkylene oxide polyol, pentaerythritol based polyol, and mixtures thereof. Examples of preferred polyols and some useful ranges for polyol combinations are listed below.

SUMMARY OF EFFECTIVE POLYOL RANGES

| POLYOL CLASSIFICATION | POLYOL TRADE NAME | OH NUMBER (Average) | RANGES PHP (Parts per hundred of total polyol) |
|---|---|---|---|
| Glycerol | — | 1,815 | 5–40 |
| Polyalkylene oxide | Arcol LHT-28[1] | 28 | 5–100 |
| Trimethylol propane initiated polyalkylene oxide | Multranol 4012[2] | 380 | 5–60 |
| Propoxylated amine | Multranol 9144[2] | 150 | 5–100 |
| Aliphatic amino | Thanol SF-265[1] | 638 | 5–20 |
| Sorbitol glycol propoxylate | Alkapol SOR-490[5] | 490 | 5–40 |
| Mixture of propoxylated glycerine and propoxylated sucrose | Voranol 370[3] | 370 | 5–40 |
| Mannich base initiated polyalkylene oxide | Alkapol XA5-425[5] | 425 | 5–40 |
| Sucrose based amino | Alkapol SA-530[5] | 530 | 5–30 |
| Polyalkylene oxide triol | Arcol E-786[1] | 35 | 5–90 |
| Pentaerythitol | — | 1,650 | 0.05–3 |
| Aromatic amine initiated polyalkylene oxide | Multranol 4063[2] | 460 | 5–25 |
| Polyalkylene oxide | Arcol PPG-4025[1] | 27 | 5–90 |
| Polypropylene oxide triol | Poly-G 30-168[4] | 168 | 0–100 |
| Polypropylene oxide diol | Poly-G 20-112[4] | 112 | 0–100 |
| Polypropylene oxide triol | Arcol LG-56[1] | 56 | 0–100 |
| Aromatic polyester | Stepanpol P5-4002[6] | 400 | 0–45 |

[1]ARCO,
[2]Bayer,
[3]Dow Chemical,
[4]Olin,
[5]Rhone-poulenc,
[6]Stepan.
PHP = parts polyol ÷ parts total polyol in 'B' component × 100.

In accordance with the present invention, a gas incapable of being liquefied within the limits of DOT aerosol cans at normal storage and operational temperatures is used as an inert propellant for the contained composition and blowing agent for the released foam composition. In this regard, preferred non-liquefiable gases are $CO_2$, and $N_2O$ with $CO_2$ being especially preferred. A typical 340 gram can of foamable composition will preferably contain approximately 4%, i.e. 6–18 grams, of $CO_2$ based on the total weight of the composition. These gases can be used alone or in combination with each other or with other blowing agents/propellants or propellant gases such as $N_2$ or He. For example, the compositions of the present invention can also include auxiliary blowing agents/propellants such as liquefiable gaseous materials like low molecular weight hydrocarbons, HCFC's, HFC's and CFC's to the extent legally permitted as well as liquid blowing agents such as liquid low molecular weight hydrocarbons, liquid HCFC's, liquid HFC's and liquid CFC's, e.g. pentane, R-11 (trichlorofluoromethane), 141b (1,1dichloro-1-fluoroethane), HFC 245fa ((1,1,1,3,3)-pentafluoropropane), and mixtures thereof. Preferably these auxiliary liquefiable blowing agents/propellants are present in an amount of no more than 10% by weight of the entire composition.

It will also be appreciated that the compositions useful for the present invention can include a number of additional components such as catalysts, especially amine and/or tin catalysts, surfactants, fire resistance additives, and other additives such as, for example, additives to increase the solubility of the blowing agent/propellant. In this last regard, additives can be used to increase the solubility of $CO_2$ and $N_2O$ in the composition. These additives can also provide a desirable viscosity depressant effect on the composition which enhances the flow through the nozzle and enhances the total formulation, allowing a greater percentage of 'B' component to 'A' component than may otherwise be practical.

These and other features of the present invention will be apparent from the following examples.

EXAMPLE 1A

| Resin Composition | Wt. % |
|---|---|
| 30-168 | 75.0 |
| DMDEE | 3.0 |
| PAROIL 45 | 20.1 |
| L 5340 | 1.9 |
|  | 100% |

In the above example, the component 30-168 is a polyether polyol having a molecular weight of approximately 1000 and including a plurality of secondary hydroxyl groups. This polyol has the following general specifications.

| Hydroxyl No. | 158–178 |
|---|---|
| Acid No. | 0.05 max |
| Average Molecular Weight | 1,000 |
| Density at 20° C. | 1.02 |

The viscosity of 30-168, in centipoise (cps), is 300 at 20° C. and 100 at 40° C. "DMDEE" is a catalyst, generally described as a high boiling amine suitable for use in moisture cured foams. This component is believed to be a dimorpholine diethyl ether. This catalyst is selected for a combination of stability in the presence of a prepolymer and good catalytic action when exposed to moisture, particularly moisture from the atmosphere, however, any one of several other types of catalysts suitable for use with polyurethane can be used as well.

The Paroil 45 is a chlorinated paraffin material useful for imparting some fire resistance to urethane foams. Such compositions have a varied molecular makeup, and a specific gravity of about 1.16 at 35° C.

The L 5340 is a silicone surfactant which is best described as a polyalkyleneoxidimethylsiloxane co-polymer. This material has a boiling point of over 150° C., a specific gravity of 1.05, a freezing point of 10° C. and is water soluble. Such surfactants are known to those skilled in the art of resin foam formulations.

140 grams of the above ingredients were placed in sealed, pressurizable containers with 187 grams of Mondur 582 sold by Bayer. Mondur 582 is a polymeric diphenylmethane diisocyanate (MDI) having an approximate molecular weight of about 350 and comprising 4,4'-diphenylmethane diisocyanate (MDI) (in an upper bound concentration of about 46%) diphenylmethane diisocyanate (2,2'; 2,4') (in an upper bound concentration of about 10%) and higher oligomers of MDI (in an upper bound concentration of about 50%). The containers were pressurized with $CO_2$ at 240 psi gauge under continuous agitation until saturation of the $CO_2$ was achieved. Each can contained, on the average, 15.4 grams of $CO_2$ and the cans showed an average internal pressure of about 185 psi gauge. The composition in the can had a free NCO content of about 16.1%.

EXAMPLE 1B

Example 1A was repeated with a portion of the 30-168 placed with diisobutyl DBE as follows:

| Resin Composition | Wt. % |
|---|---|
| 30-168 | 64.0 |
| DMDEE | 3.0 |
| PAROIL 45 | 20.1 |
| Diisobutyl DBE | 11.0 |
| L 5340 | 1.9 |
| | 100% |

Diisobutyl DBE refers to a mixture of methyl esters (boiling point in the range of 385 to 487° F.), an ingredient that appears to impart increased solubility to the $CO_2$ in keeping with the invention. As the result of the presence of diisobutyl DBE, it was found that more $CO_2$ could be retained in the mix at a lower pressure than would ordinarily be the case. Other additives known to impart increased $CO_2$ solubility are TEP, Propylene Carbonate, BLO, Acetone, and Methylene Chloride. Any other chemicals otherwise compatible with single component chemistry and demonstrating a high solubility for $CO_2$ or $N_2O$ should likewise be effective.

152 grams of the above ingredients were placed in sealed, pressurizable containers with 175 grams of Mondur 582. The container was pressurized with $CO_2$ at 240 psi gauge under continuous agitation until saturation of the $CO_2$ was achieved. The cans contained, on average, about 16.7 grams of $CO_2$ and showed an internal pressure, on average, of about 180 psi gauge. The composition in the can had a free NCO content of 16.2%. Upon dispensing from an aerosol can with an appropriate valve and a discharge tube of a six inch length and an inside diameter of about 0.140 inches, each composition of the various examples had the properties and/or ratings shown in the table entitled "Data Observations—Example__."

Regarding such data observations, the particular characteristics for which the finished foam product is evaluated are rated numerically according to the table immediately below.

| DATA OBSERVATIONS FOR CAN DISPENSING | | |
|---|---|---|
| Characteristic | 0 | 5 |
| Single bead @ 24 hrs. | Large, coarse cells | Small, fine uniform cells |
| Large sample @ 24 hrs. | Large voids | Small, fine uniform cells |
| Density | Numerical value for density and bead diameter | |
| Tack Free (Minutes) | Numerical value | |

As appears, a rating of from 0 to 5 is given as an approximate rating indicating the extent to which the product has or lacks the property in question, the higher, the better. Large samples were made by dispensing beads of the foam side by side onto a 6"×6" area and allowed to cure 24 hours before being cut diagonally into thirds. Cell ratings from the large foam samples were an average of the cells found in the middle of the foam and the foam found on the edges. Densities were determined based on an overall density of a specific size bead including skin. Where a characteristic is indicated for which there is a numerical value, the value appears. It will be appreciated that the values set forth for all evaluations are approximate values and subject to normal experimental error variances. All foams were cured and tack-free measured at 73° F.±3° F. and 50%RH±5% relative humidity.

Referring to the constituents of Example 1, its properties were as follows:

| Characteristic | |
|---|---|
| DATA OBSERVATIONS - EXAMPLE 1A | |
| Single bead @ 24 hrs. | 4.25 |
| Large sample @ 24 hrs. | 4.5 |
| Density | 4.7 pcf @ 0.6" average diameter |
| Tack Free (Minutes) | 6 |
| DATA OBSERVATIONS - EXAMPLE 1B | |
| Single bead @ 24 hrs. | 3.75 |
| Large sample @ 24 hrs. | 3.75 |
| Density | 5.4 pcf @ 0.5" average diameter |
| Tack Free (Minutes) | 5 |

EXAMPLE 2

Another composition was made, as follows:

| Resin Composition | Wt. % |
|---|---|
| 30-168 | 24.1 |
| LG 56 | 32.1 |
| PS4002 | 16.2 |
| PCF | 24.4 |
| DMDEE | 1.1 |
| L 5340 | 2.1 |
| | 100% |

In the above table, LG 56 is a polyether polyol based on glycerol and propylene oxide so as to provide a polyol, in the finished product, consisting mainly of secondary hydroxyl groups. This component has a hydroxyl number of about 56–59, an acid number of not more than 0.05 and an average molecular weight of about 3,000.

PS4002 is a low viscosity aromatic polyester polyol. This product has primary hydroxyl groups and has a hydroxyl number of about 390–410, an acid number of 1.0. This product has a specific gravity of about 1.22 at 25° C. and an average molecular weight of about 280. The PCF is a chlorinated phosphate ester used as a fire retardant, and viscosity control agent.

147 grams of the composition of Example 2 were added to 180 grams of Mondur 582 in sealed pressurizable containers. The container was agitated and charged with $CO_2$ at 160 psi gauge until saturation was achieved, at which time 9.9 grams of $CO_2$, on average, had been added. The product as a whole then had an NCO content of about 15.4%. The cans showed an average internal pressure of about 130 psi gauge.

The product of Example 2 had the following ratings/characteristics, on the same scale as described earlier.

| DATA OBSERVATIONS - EXAMPLE 2 | |
|---|---|
| Characteristic | |
| Single bead @ 24 hrs. | 3.75 |
| Large sample @ 24 hrs. | 3 |
| Density | 3.7 pcf @ 0.6" average diameter |
| Tack Free (Minutes) | 12 |

EXAMPLE 3

Ingredients as set forth in the following table were mixed in the proportion shown:

| Resin Composition | Wt. % |
|---|---|
| 30-168 | 24.1 |
| LG 56 | 32.1 |
| PS4002 | 16.2 |
| PCF | 24.4 |
| DMDEE | 1.1 |
| N60 | 2.1 |
| | 100% |

In the above table, all of the ingredients are as previously described, except that the composition identified as Surfonic N60 from Huntsman is an ethoxylated alkylphenol, most or all being a n-nonyl phenol with glycol ether solubilizing groups. The foregoing ingredients were mixed in the amount of 147 grams with 180 grams of Mondur 582 referred to in the above example. The container was agitated and charged with $CO_2$ at 240 psi gauge until saturation was achieved at which time about 11.6 grams of $CO_2$, on average, had been added. The can showed an internal pressure of 180 psi gauge. The properties of the resulting product were set forth in the table below.

| DATA OBSERVATIONS - EXAMPLE 3 | |
|---|---|
| Characteristic | |
| Single bead @ 24 hrs. | 3 |
| Large Sample @ 24 hrs. | 1 |
| Density | 4.2 pcf @ 0.6" average diameter |
| Tack Free (Minutes) | 12 |

In the above Examples 2 and 3, although no solvents were present to increase the solubility of the blowing/propellant gas, the sealing compositions were still very effective from the functional standpoint. The following example illustrates an additional composition wherein another blowing agent/propellant gas such as $N_2O$ was used. Another composition of Example 2 was made in which $N_2O$ (Example #4) was substituted for $CO_2$. The $N_2O$ was charged into the can at 240 psi gauge with agitation until saturation was effected, at which time 16.5 grams of $N_2O$, on average, had been added. The can showed an average internal pressure of 195 psi gauge.

| DATA OBSERVATIONS - EXAMPLE 4 | |
|---|---|
| Characteristic | |
| Single bead @ 24 hrs. | 3.75 |
| Large sample @ 24 hrs. | 4 |
| Density | 3.4 pcf @ 0.6" average diameter |
| Tack Free (Minutes) | 10 |

Attempts have been made to increase curing by using so-called cell openers, which theoretically affect the surface tension of the composition and still allow initial cell formation to take place. The compositions using a cell opener did exhibit open cells and improved cell structure in the single bead.

In the following three examples (i.e., Examples 5, 6 and 7), 180 grams of Mondur 582 and 147 grams of the Resin composition were combined and pressurized initially with 240 psi of $CO_2$. Example 5 held 12 grams of $CO_2$, on average, and had an average internal pressure of 185 psi gauge. Example 6 held 12.1 grams of $CO_2$, on average, and had an average internal pressure of 190 psi gauge. Example 7 held 13.5 grams of $CO_2$, on average, and had an average internal pressure of 215 psi gauge. Examples of using cell openers or other surfactants are as follows:

| Resin Composition | Wt. % |
|---|---|
| 30-168 | 24.1 |
| LG 56 | 31.6 |
| PS4002 | 16.2 |
| PCF | 24.4 |
| DMDEE | 1.1 |
| L 5340 | 2.1 |
| EP 89-95-03 | 0.53 |
| | 100% |

EP 89-95-03, commercially known as Ortegol 501 from Goldschmidt Chemical Corp., is an emulsion of organic polymers which does not contain any silicone compounds. This product has a viscosity (25 C) of about 310 cps, a specific gravity (20 C) of about 0.95 +/− 0.03 g/cm$^3$, a hydroxyl number of about 24 and a flash point of greater than 200 F.

| DATA OBSERVATIONS - EXAMPLE 5 | |
|---|---|
| Characteristic | |
| Single bead @ 24 hrs. | 2 |
| Large sample @ 24 hrs. | 1.75 |
| Density | 3.7 pcf @ 0.6" average diameter |
| Tack Free (Minutes) | 10 |

| EXAMPLE 6 | |
|---|---|
| Resin Composition | Wt. % |
| 30-168 | 24.1 |
| LG 56 | 32 |

-continued

| | |
|---|---|
| PS4002 | 16.2 |
| PCF | 24.4 |
| DMDEE | 1.1 |
| L 5340 | 2.1 |
| EP-89-95-03 | 0.11 |
| | 100% |

DATA OBSERVATIONS - EXAMPLE 6

Characteristic

| | |
|---|---|
| Single bead @ 24 hrs. | 2.5 |
| Large sample @ 24 hrs. | 3.25 |
| Density | 4.3 pcf @ 0.7" average diameter |
| Tack Free (Minutes) | 11 |

EXAMPLE 7

| Resin Composition | Wt. % |
|---|---|
| 30-168 | 24.1 |
| LG 56 | 32.1 |
| PS4002 | 16.2 |
| PCF | 24.4 |
| DMDEE | 1.1 |
| Surfactant B8465 | 2.1 |
| | 100% |

B8465 is a polyether-modified polysiloxane available from Goldschmidt Chemical Corp. B8465 has a specific gravity of 1.03601, a vapor density heavier than air, a liquid density heavier than water, and a pH of about 7.4.

DATA OBSERVATIONS - EXAMPLE 7

Characteristic

| | |
|---|---|
| Single bead @ 24 hrs. | 4.75 |
| Large sample @ 24 hrs. | 4 |
| Density | 2.9 pcf @ 0.6" average diameter |
| Tack Free (Minutes) | 10 |

From the foregoing examples, it can be concluded that it is possible to create a packagable, single-component urethane foam capable of being dispensed and blown with an inert non-liquefiable gas not presenting the environmental drawbacks of using present day liquefiable gases, for example. Satisfactory foams, and adhesive sealants are made utilizing the isocyanate component, catalyst and polyester polyols and/or polyether polyols together with additional ingredients of the types discussed herein. By charging the containers with gaseous pressures up to less than the liquefiable pressures of the gas and agitating the container to create mixing by the use of enclosed high density objects such as ballbearings or the like, highly effective useful adhesive sealant products may be created.

We claim:

1. A foamable one component composition capable of creating an expanded cellular sealant having adhesive properties packaged in an aerosol can, said packaged composition comprising a polyol composition having an average molecular weight of less than 10,000, a catalyst and a multi-functional isocyanate, said composition further including a propellant/blowing agent, said propellant/blowing agent consisting of an inert gas incapable of being liquefied at 240 psi within an aerosol can, said sealant having a density when expanded of from 2.9 p.c.f. to 5.4 p.c.f. and wherein said sealant is expanded solely by the expansion of said inert gas.

2. A composition as defined in claim 1 wherein said propellant/blowing agent is selected from the group consisting of $CO_2$, $N_2O$, $N_2$ gases and mixtures thereof.

3. A composition as defined in claim 1 wherein said inert propellant/blowing agent is $CO_2$.

4. The composition of claim 1 wherein said polyol composition has an average molecular weight in the range of between about 1,000 and about 3,000.

5. A composition as defined in claim 1 wherein said composition is packaged within a pressurized container and the internal pressure is between 40 psi gauge and less than the liquefiable pressure of the gas.

6. A composition as defined in claim 1 wherein said polyol composition comprises a mixture of polyols.

7. A composition as defined in claim 1 wherein said polyol composition is selected from the group consisting of glycerin, an aliphatic amino polyol, pentaerythritol, polyester polyols and polyether polyols and mixtures thereof.

8. A composition as defined in claim 7 wherein said polyether polyols are selected from the group consisting of polyalkylene oxide diol or triol, trimethylol propane initiated polyalkyene oxide polyol, sorbitol glycol propoxylate, sucrose polyalkylene oxide polyol, sucrose-glycerine polyalkylene oxide polyol, mannich base initiated polyalkylene oxide polyol, aromatic amine initiated polyalkylene oxide polyol, and mixtures thereof.

9. A composition as defined in claim 1 which further includes a flame retardant.

10. A composition as defined in claim 9 wherein said flame retardant is selected from the group consisting of halogenated compositions and phosphorus containing compositions and mixtures thereof.

11. A composition as defined in claim 1 wherein said product further includes a cell opener.

12. A one component urethane packaged composition for creating an adhesive, insulating, expanded cellular sealant, said packaged composition comprising, in combination, a container capable of withstanding internal pressure of at least 140 psi, a resin component containing polyols having an average molecular weight of not more than 10,000, and a multi-functional isocyanate component, said packaged composition including a blowing agent/propellant gas incapable of being liquefied at 240 psi gauge within an aerosol can, said gas selected from the group consisting of $CO_2$ and $N_2O$ gases and mixtures thereof, said gas being present in an amount by weight equal to at least 0.5% of the weight of said packaged composition, said sealant having a density when expanded of from 2.9 p.c.f. to 5.4 p.c.f., and wherein said sealant is expanded solely by the expansion of said blowing agent/propellant gas.

13. The composition defined in claim 12 wherein said composition further comprises an emulsifier, a fire retardant, a diluent, and a surfactant.

14. A composition as defined in claim 12 wherein said composition further comprises a solubility enhancer for said gas.

15. A composition as defined in claim 14 wherein said enhancer is selected from the group consisting of aliphatic phosphates, aliphatic carbonates, lactones, ketones, esters, and chlorinated hydrocarbons.

16. A composition as defined in claim 12 wherein said polyol is selected from the group consisting of polyether and polyester polyols and mixtures thereof.

17. An insulating foam, adhesive and sealant composition formed from the reaction of a premixed composition in a single container comprising a polyol material having an average molecular weight of less that 10,000, a multi-functional isocyanate, and an inert gas which is incapable of being liquefied at a pressure of 240 pounds per square inch, said product being curable by the absorption of moisture from the atmosphere and being propelled and expanded to a density of from 2.9 p.c.f. to 5.4 p.c.f. solely by said non-liquefiable gas, said gas consisting of carbon dioxide.

18. A composition as defined in claim 17 wherein said isocyanate is selected from the group consisting of aromatic isocyanates, alicyclic isocyanates, aliphatic isocyanates and mixtures thereof.

19. A composition as defined in claim 17 wherein said isocyanate is selected from the group consisting of MDI, TDI, HMDI and mixtures thereof.

20. A composition as defined in claim 17 wherein said polyol comprises polyether polyols.

21. A composition as defined in claim 20 wherein said polyether polyols are selected from the group consisting of polyalkylene oxide diol or triol, trimethylol propane initiated polyalkyene oxide polyol, sorbitol glycol propoxylate, sucrose polyalkylene oxide polyol, sucrose-glycerine polyalkylene oxide polyol, mannich base initiated polyalkylene oxide polyol, aromatic amine initiated polyalkylene oxide polyol, and mixtures thereof.

22. A composition as defined in claim 17 wherein said polyol is selected from the group consisting of glycerin, aliphatic amino polyol, pentaerythritol, polyether polyols and polyester polyols and mixtures thereof.

23. A composition as defined in claim 22 wherein said polyether polyols are selected from the group consisting of polyalkylene oxide diol or triol, trimethylol propane initiated polyalkylene oxide polyol, sorbitol glycol propoxylate, sucrose polyalkylene oxide polyol, sucrose-glycerine polyalkylene oxide polyol, mannich based initiated polyalkylene oxide polyol, aromatic amine initiated polyalkylene oxide polyol, and mixtures thereof.

24. A single component urethane composition packaged in an aerosol container, said composition being capable of expansion into a foamed structure upon expulsion from said container, said composition comprising a polyol component having an average molecular weight of not more than 4800, a multi-functional isocyanate component, and a catalyst component, and said composition further including an inert blowing agent/propellant gas component consisting of $CO_2$ gas incapable of being liquefied at 240 psi, said foamed structure having a density of from 2.9 p.c.f. to 5.4 p.c.f., said expansion into said foamed structure being accomplished solely by said gas.

25. The composition of claim 24 wherein said catalyst is an amine.

\* \* \* \* \*